United States Patent
Barnard et al.

[11] Patent Number: 5,708,114
[45] Date of Patent: Jan. 13, 1998

[54] CROSSLINKERS FOR SILAZANE POLYMERS

[75] Inventors: Thomas Duncan Barnard, Midland; Duane Ray Bujalski, Auburn; Gregg Alan Zank, Midland, all of Mich.

[73] Assignee: Dow Corning Corporation, Midland, Mich.

[21] Appl. No.: 805,397

[22] Filed: Feb. 24, 1997

Related U.S. Application Data

[62] Division of Ser. No. 650,389, May 20, 1996, Pat. No. 5,665,848.

[51] Int. Cl.$^6$ .................................................. C08G 77/08
[52] U.S. Cl. ............... 528/15; 528/24; 427/227; 427/228; 501/88; 501/92
[58] Field of Search ............ 501/88, 92; 427/227, 427/228; 528/15, 24

[56] References Cited

U.S. PATENT DOCUMENTS

| | | | |
|---|---|---|---|
| 5,086,126 | 2/1992 | Mahone | 525/474 |
| 5,169,908 | 12/1992 | Zank | 525/474 |
| 5,262,553 | 11/1993 | Bujalski et al. | 556/402 |

*Primary Examiner*—Melvyn I. Marquis
*Attorney, Agent, or Firm*—Sharon K. Severance

[57] ABSTRACT

A method of crosslinking a silazane polymer having Si—H bonds in which the polymer is mixed with a crosslinker selected from alkenyl functional cyclosiloxanes and alkenyl functional cyclosilazanes and a crosslinking promoter and then heated to a temperature sufficient to crosslink the silazane polymer. The mixture of the silazane polymer, crosslinker and promoter is useful in the formation of ceramic matrix composites.

4 Claims, No Drawings

CROSSLINKERS FOR SILAZANE POLYMERS

This application is a division of application Ser. No. 08/650,389 filed May 20, 1996 now U.S. Pat. No. 5,665,848.

BACKGROUND OF THE INVENTION

The present invention relates to materials which are useful for crosslinking silazane polymers. These crosslinkers improve the processability of the silazanes so they can be used as precursors to the matrix in ceramic matrix composites.

Ceramic matrix composites (CMCs) and methods for there manufacture are well known in the art. Generally, CMCs comprise a matrix phase which can be formed by chemical vapor deposition, polymer infiltration pyrolysis, and the like and a reinforcement phase such as fibers.

The polymer impregnation approach to making CMCs essentially comprises infiltrating an assembly of fibers with a preceramic polymer and then heating the impregnated fibers to ceramify the polymer. Often, the body formed thereby needs repeated impregnation with the preceramic polymer and pyrolysis to increase the density of the resulting object.

The preparation of thermally and oxidatively stable CMCs by the polymer impregnation approach is at least partially dependent on the preceramic polymer chosen for impregnation of the fibers. Silazane polymers (or polysilazanes—characterized as having backbones with alternating silicon and nitrogen atoms) have been shown in the art to be useful for this purpose.

To be truly useful as ceramic precursors, however, the polysilazanes must be curable (infusible or crosslinkable) to prevent deformation of the ceramic upon heating. Various approaches to providing curability have been suggested. Thus, for instance, European Publication 549,224 teaches the use of silazanes in a polymer impregnation and pyrolysis process for manufacturing CMCs. This patent mentions the desirability of curable polymers but does not teach the curing materials set forth herein.

U.S. Pat. No. 5,086,126 teaches a method of producing silazane polymers having functional groups attached thereto. The method described therein comprises treating a silazane polymer having N—H bonds with an alkyllithium and then reacting the resultant material with a chlorosilane having the desired functional group. The reference teaches that the functional group may be one which allows for curing the polymer, but it does not teach the curing materials of the present invention.

U.S. Pat. No. 5,169,908 teaches curable hydridopolysilazane polymers obtained by reacting these polymers with borane. The resultant polymers have B—H bonds which, upon heating, can react with Si—H and N—H bonds in the polymers and, thus, cause them to crosslink. This reference, too, fails to teach the curing materials claimed herein.

U.S. Pat. No. 5,262,553 teaches a method for crosslinking polysilazanes. The method described therein comprises reacting a crosslinking material having 2 boron functional groups with a polysilazane having Si—H or N—H bonds. Pursuant to this reaction, B—N or B—Si bonds are formed and the polymer is thereby crosslinked. Again, this reference does not teach the materials claimed herein.

The present inventors have now discovered that cyclic siloxanes and silazanes can be used to cure Si—H functional silazane polymers.

SUMMARY OF THE INVENTION

The present invention relates to a method of crosslinking a silazane polymer. The method comprises first preparing a mixture comprising a silazane polymer having Si—H bonds, a crosslinker selected from the group consisting of alkenyl functional cyclosiloxanes and alkenyl functional cyclosilazanes and a crosslinking promoter. The mixture is then heated to a temperature sufficient to crosslink the silazane polymer.

DETAILED DESCRIPTION OF THE INVENTION

The present invention is based on the discovery that alkenyl functional cyclosiloxanes and alkenyl functional cyclosilazanes can be used to crosslink polysilazanes having Si—H bonds and, thus, render them more useful as ceramic precursors. The approach claimed in the present invention has many advantages. For instance, this approach allows for better control over the crosslinking reaction and it allows for deep section curing of the polymers. Similarly, these mixtures can be tailored for ease in processing. For example, the crosslinker can be used to modify the viscosity of the material so that it has the appropriate properties for a given application. Additionally, since a solvent is not necessary, solvent removal steps in the processing are not required resulting in a higher char yield.

The method of curing the polysilazanes of the present invention involves mixing the polysilazane having Si—H bonds with the crosslinker and the crosslinking promoter followed by heating to facilitate the crosslinking reaction. Upon reaction, the alkenyl groups on the crosslinker react with the Si—H bonds of the polysilazane to form Si—C bonds and, thereby, cause crosslinking.

The polysilazanes which are useful herein can be any which have Si—H bonds for reaction. Generally, these polymers have backbones of repeating silicon and nitrogen atoms and can have units of the type [R'R"SiNH], [R'Si(NH)$_{1.5}$], and/or [R'R"R'"Si(NH)$_{0.5}$], where each R', R", and R'" is independently selected from the group consisting of hydrogen, alkyl radicals containing 1 to 20 carbon atoms such as methyl, ethyl, propyl etc., aryl radicals such as phenyl, and unsaturated hydrocarbon radicals such as vinyl and hexenyl. Additionally, these hydrocarbon radicals can contain hetero atoms such as silicon or nitrogen to produce groups such as alkylaminos, aminoalkyls, silyls, etc. Obviously, at least 1 R', R" or R'" in these polymeric units must be a H for the crosslinking reaction. Examples of specific polysilazane units include [Ph$_2$SiNH], [PhSi(NH)$_{1.5}$], [MeSi(NH)$_{1.5}$], [Me$_2$HSi(NH)$_{0.5}$] [MeHSiNH], [ViSi(NH)$_{1.5}$], [Vi$_2$SiNH], [PhViSiNH], [HSi(NH)$_{1.5}$], [PhHSiNH], [MeViSiNH], and the like. These polysilazanes may be homopolymers where each unit has an Si—H bond or they may be co-polymers where one or more units have Si—H bonds while other units do not include Si—H bonds.

Representative non-limiting examples of such polymers include those of Gaul in U.S. Pat. Nos. 4,312,970, 4,395,460, 4,404,153 and 4,340,619, those of Cannady in U.S. Pat. No. 4,540,803, those of Gerdau et al. in European Patent 351,747, those of Haluska in U.S. Pat. No. 4,482,689, those of Seyferth et al. in U.S. Pat. No. 4,397,828, those of U.S. Pat. No. 4,543,344, those of European Patent 332,374, those of Cannady in U.S. Pat. Nos. 4,540,803 and 4,543,344, those of Burns et al. in J. Mater. Sci, 22 (1987), pp 2609–2614, and Burns in U.S. Pat. Nos. 4,835,238, 4,774,312, 4,929,742 and 4,916,200, those described by Funayama et al. in U.S. Pat.

No. 5,030,744 and those of Lebrun et al. in U.S. Pat. Nos. 4,656,300 and 4,689,252, the disclosures of which are all hereby incorporated by reference.

The polysilazane may also be substituted with various metal groups (i.e., containing repeating metal-N-Si units). Examples of suitable compounds include borosilazanes which are known in the art. These include, but are not limited to, those described in U.S. Pat. No. 4,910,173 granted to Niebylski, those described by Haluska in U.S. Pat. No. 4,482,689, those described by Zank in U.S. Pat. Nos. 5,164,344, 5,252,684 and 5,169,908, those described by Funayama et al., in U.S. Pat. No. 5,030,744, those described by Seyferth et al., J. Am. Ceram. Soc. 73, 2131–2133 (1990), those described by Noth, B. Anorg. Chem. Org. Chem., 16(9), 618–21, (1961), and those described by Araud et al. in European Patent No. 364,323, which are all incorporated herein by reference in their entirety.

The preferred polymers to be used herein are those of Cannady in U.S. Pat. No. 4,540,803, which is incorporated herein by reference. These polysilazanes are prepared by a method which comprises contacting and reacting in an inert essentially anhydrous atmosphere, trichlorosilane and a disilazane at a temperature in the range of 25° C. to 300° C. while distilling volatile byproducts. The disilazane used in the process has the formula $(R_3Si)_2NH$ where R is selected from the group consisting of vinyl, hydrogen, phenyl and alkyl radicals containing 1 to 3 carbon atoms.

An especially preferred embodiment of the Cannady invention involves the reaction of trichlorosilane with hexamethyldisilazane. The resultant polymer produced thereby, hydridopolysilazane, has been shown to have valuable preceramic properties.

Although the polymers of the Cannady invention are specifically set forth, nearly any polysilazane with Si—H bonds may be used in the invention.

The crosslinker used in the present invention is selected from the group consisting of alkenyl-functional cyclosiloxanes and alkenyl-functional silazanes. These materials are known in the art and can be produced by known techniques.

Alkenyl-functional cyclosiloxanes have the general structure:

$[R^{iv}R^vSi-O]_n$

In this structure, each $R^{iv}$ and $R^v$ is independently a hydrogen, a hydrocarbon of 1–20 carbon atoms or a hydrocarbon of 1–20 carbon atoms substituted with silicon, nitrogen or boron. Specific examples include alkyls such as methyl, ethyl, propyl, butyl, etc., alkenyls such as vinyl, allyl, and hexenyl, aryls such as phenyl, cycloalkyls such as cyclohexyl, alkaryls, alkylaminos, alkylsilyls, alkylboryls and the like. In this structure n can be from 3 to about 10.

For this material to be able to crosslink the siliazane, at least 2 of the $R^{iv}$ or $R^v$ groups in this formula must be alkenyls. This could be 2 alkenyl groups attached to the same silicon or it could be an alkenyl group on 2 different silicon atoms.

Examples of suitable cyclosiloxanes include tetramethyl divinyl cyclotrisiloxane, hexamethyl dihexenyl cyclotetrasiloxane, octamethyl divinyl cyclopentasiloxane, dimethyl divinyl cyclotrisiloxane, tetramethyl divinyl cyclotetrasiloxane, hexamethyl divinyl cyclopentasiloxane, tetraethyl divinyl cyclotrisiloxane, hexaethyl divinyl cyclotetrasiloxane, tetramethyl tetraphenyl divinyl cyclopentasiloxane, and the like.

These materials are generally formed by the hydrolysis and condensation of halosilanes or alkoxysilanes. Methods for their manufacture can be found in *Chemistry and Technology of Silicones* by Walter Noll(Academic Press 1960).

The other crosslinkers that can be used in this invention are alkenyl-functional cyclosilazanes having the general structure:

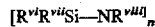

$[R^{vi}R^{vii}Si-NR^{viii}]_n$

Each $R^{vi}$, $R^{vii}$ and $R^{viii}$ in this formula is independently a hydrogen, a hydrocarbon or 1–20 carbon atoms or a hydrocarbon of 1–20 carbon atoms substituted with silicon, nitrogen or boron. Specific examples include alkyls such as methyl, ethyl, propyl, butyl, etc., alkenyls such as vinyl, allyl and hexenyl, aryls such as phenyl, cycloalkyls such as cyclohexyl, alkaryls, alkylaminos, alkylsilyls, alkylboryls and the like. n in this structure can be from 3 to about 10.

Again, at least 2 of the $R^{vi}$ or $R^{vii}$ groups in this formula must be alkenyl. This could be 2 alkenyl groups attached to the same silicon or it could be an alkenyl group on 2 different silicon atoms.

Examples of suitable cyclosilazanes include tetramethyl divinyl cyclotrisilazane, hexamethyl divinyl cyclotetrasilazane, octamethyl dihexenyl cyclopentasilazane, dimethyl divinyl cyclotrisilazane, tetramethyl divinyl cyclotetrasilazane, hexamethyl diallyl cyclopentasilazane, tetraethyl divinyl N-phenyl cyclotrisilazane, hexaethyl divinyl cyclotetrasilazane, tetramethyl tetraphenyl divinyl cyclopentasilazane, and the like.

These materials are generally formed by the hydrolysis and condensation of aminosilanes. Methods for their manufacture can again be found in *Chemistry and Technology of Silicones* by Walter Noll(Academic Press 1960).

Also included in the mixture is a crosslinking promoter (curing agent). Conventional crosslinking promoters which are useful in the present invention are well known in the art. Examples include organic peroxides such as dibenzoyl peroxide, bis-p-chlorobenzol peroxide, bis- 2,4-dichlorobenzol peroxide, di-t-butyl peroxide, dicumyl peroxide, t-butyl perbenzoate, 2,5-bis(t-butylperoxy)-2,3-dimethylhexane and t-butyl peracetate; and platinum-containing crosslinking promoters such as platinum metal, $H_2PtCl_6$, and $((C_4H_9)_3P)_2PtCl_2$. Other conventional crosslinking promoters known in the art may also be used.

The crosslinking promoter is present in an effective amount, i.e. an amount sufficient to induce crosslinking in the polymer. Therefore, the actual amount of the crosslinking promoter will depend on the activity of the actual agent used and the amount of polymer present. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

The above crosslinkers, crosslinking promoters and polysilazanes are mixed and the crosslinking reaction initiated. They may be mixed in their liquid state or, alternatively, they may be blended in a solvent.

If a solvent is used, it may include any which act as a solvent for the polysilazane, crosslinker and crosslinking promoter and which do not cause rearrangement of either species. Examples of such solvents include alkanes such as pentane, hexane, heptane, octane etc., ethers such as tetrahydrofuran, or aromatic hydrocarbons such as benzene, toluene, xylene etc.

The crosslinker and the polysilazane may be blended in nearly any ratio desired to provide sufficient flow and final cure. Generally, however, the crosslinker is present in an amount of at least about 0.01 wt. % crosslinker based on the weight of the polysilazane with a range of about 0.01 to about 50 wt. % being preferred. In addition, it is also contemplated herein that several polysilazanes (eg., of varying viscosity), several crosslinkers or other desirable materials (eg., ceramic fillers) may be blended with the mixture to provide desirable properties.

It has been discovered that when the crosslinkers are blended in small amounts (eg., 10–25 wt %) with high molecular weight polysilazanes (e.g., 10,000 Mw); they are especially valuable as materials used to initially impregnate an assembly of fibers in the production of a ceramic matrix composite (i.e., pre-preg resins). Similarly, it has been discovered that when the crosslinkers are blended in larger amounts (e.g., >15 wt %) with low molecular weight polysilazanes (e.g., 4,000 Mw), they are especially valuable as materials used to reimpregnate porous composites (densification resins). These discoveries are especially valuable since solvents are generally not necessary to control viscosity and, thus, they are more volume efficient than organic solutions of the polysilazanes.

The polysilazane/crosslinker/promoter mixture is then exposed to conditions which facilitate the crosslinking reaction. Generally, this involves merely heating the mixture to a sufficient temperature. Temperatures in the range of 50°–500° C. are generally sufficient. Preferred temperatures are in the range of about 75°–300° C. Other means of inducing crosslinking such as radiation are, however, also contemplated.

The polysilazane/crosslinker/promoter preceramic mixture is especially useful in the formation of matrices for ceramic matrix composites. In addition, however, the material may be used for other purposes such as the formation of ceramic monoliths or ceramic fibers and to impregnate porous ceramic bodies to increase density. These mixtures are especially useful for these purposes since they flow when forming the composite to coat and fill in voids; they can be employed without organic solvents; they have a stable ceramic char; they are easily deep section curable; and they have a high char yield.

If used to form a composite, the polysilazane/crosslinker/promoter preceramic mixture (preceramic mixture) is used in a polymer infiltration process. This process comprises first impregnating an assembly of fibers with the above mixture and, if desired, fillers.

Examples of refractory fibers include those of silicon carbide, silicon nitride, silicon carbide deposited on a carbon core, aluminum borate, aluminum oxide, silicon oxide, silicon carbide containing titanium, silicon oxycarbides, silicon oxycarbonitrides, carbon and the like.

The above fibers may be provided with a coating to toughen the composite by preventing bonding and chemical reactions between the fibers and the matrix. This allows the fibers to debond and pullout under stress such that the composite does not undergo catastrophic failure as demonstrated by ceramic monoliths. Examples of coatings include carbon, boron nitride, silicon carbide, silicon nitride, aluminum nitride, and combinations of the above in thicknesses of about 0.05 to about 1.0 micrometer.

If desired, the preceramic mixtures of the invention may also contain fillers. Fillers are used herein to decrease the amount of matrix shrinkage which occurs on pyrolysis so that the resultant composites have lower porosity. Suitable fillers are known in the art and can include, for example, powders, whiskers or particulates of alumina, silica, other metal oxides, silicon carbide, silicon nitride, silicon hexaboride, aluminum nitride, boron nitride and the like.

The assembly of fibers are impregnated with the preceramic mixture by any convenient means. For instance, the fibers can be immersed in the mixture, sprayed with the mixture, held under a stream of the mixture, etc. The impregnated assembly of fibers can additionally be manipulated to uniformly distribute the matrix mixture in the fibers. Following impregnation, any excess matrix mixture on the fibers is allowed to drain off. The resultant fibers are commonly called a "pre-preg".

The prepregs may then be partially cured so that they will hold the shape imparted in a subsequent step. This partial curing, also called "B-staging", is generally accomplished by heating at a temperature in the range of about 50° to about 500° C. for about 2 minutes to about 4 hours.

The prepreg is then subjected to externally applied pressure while heating to form the composite into the desired shape and cause uniformity of resin about the fibers. Generally, this is accomplished by pressing the prepreg into a mold at a temperature and pressure which allows the resin to flow throughout the mold.

The formed prepreg is next cured to insure complete or nearly complete crosslinking such that it won't deform on pyrolysis. Any schedule as discussed above which produces the desired result may be used so long as the temperature does not cause ceramification. This curing step may be performed in the mold under pressure or it may be accomplished in a conventional oven under nitrogen without any applied pressure.

The pressed and cured product (green composite or molded part) is then slowly fired in a furnace to a temperature of at least 1000° C. in an inert atmosphere or vacuum until the product ceramifies. It is preferred that the green composite be fired at a temperature of about 1200° C.

The composites formed by the above process are generally quite porous. Since it may be preferred to produce dense objects (which have higher strength and greater oxidation resistance), the composites may be reimpregnated. This is accomplished by merely impregnating the composite with the preceramic mixture (without fillers) as described above, curing the reimpregnated composite and then firing. This "reimpregnation" can be repeated (for example up to 15 or 20 times) until products with the desired density (for example <5%) and strength are achieved.

The following non-limiting examples are provided so that one skilled in the art may more fully understand the invention.

EXPERIMENTAL SECTION

I. Materials

HPZ is hydridopolysilazane prepared by the method of Cannady in U.S. Pat. No. 4,540,803. Lupersol 101 (2,5-dimethyl-2,5(t-butylperoxy)hexane) (PennWalt Corp.), Dicup "R" (dicumyl peroxide) (PennWalt Corp.) and toluene (Fisher) were used as supplied.

Polymer pyrolysis was carried out in a Lindberg Model 54434 or similar tube furnace equipped with Eurotherm temperature controllers. In a typical pyrolysis a sample was weighed out and placed in an alumina boat and loaded into the furnace. The furnace was then purged with argon at a rate sufficient to achieve one turnover of the furnace atmosphere every 3 minutes. After purging 45 to 60 minutes the flow was reduced to allow for a turnover every 6 minutes and the temperature raised to a final temperature and held 60 minutes. The ceramic sample was then reweighed, and ground for testing and analysis.

Oxidation testing of polymer derived ceramic chars was carried out in a Lindberg Model 54434 or similar tube furnace equipped with Eurotherm temperature controllers. In a typical oxidation a sample was weighed out and placed in an alumina boat and loaded into the furnace. The furnace was then opened to the atmosphere and heated at a rate of 10° C./minute to 1000° C. where it was held for 10 hours prior to cooling to ambient temperature. The ceramic sample was then reweighed and analyzed.

II. Analysis

Carbon, hydrogen and nitrogen analysis were done on a Perkin Elemer 2400 analyzer. Oxygen analysis were done on a Leco oxygen analyzer model RO-316 equipped with an Oxygen determinator 316 (Model 783700) and an Electrode furnace EF100. Silicon analysis was determined by a fusion technique which consisted of converting the solid to a soluble form and analyzing the solute for total silicon by Arl 3580 ICP-AES analysis.

IV. Examples

Examples 1, 2, 3 and 4, Vinyl Functional Siloxane Cyclics

Polymer Blend Preperation

The method used in Example 2 will be described to illustrate the general blend preperation procedure. Low molecular weight HPZ (Mw=1817, Mn=888) (95.97 g), methylvinyl cyclosiloxanes (mixture of [MeViSiO]$_3$ and [MeViSiO]$_4$) (2.007 g) and 1.994 grams of Lupersol 101 were weighed into a dried 250 ml wheaton bottle and the formulation was mixed one hour on a rotational ball mill type mixer. The contents of the blends for examples 1, 2, 3 and 4 are summarized in Table 1 below.

Curing and Pyrolysis

The method of Example 2 will be described to illustrate the general procedure for cure and pyrolysis of polymer blends. A 4.994 gram aliquot of example 2 blend was heated to 175° C. under argon and held 10 minutes at 175° C. under argon. A 2.1214 gram aliquot of this cured example 2 blend was placed in a graphite crucible and heated under a continuous argon purge at 5° C./min. to 1200° C. and held at temperature one hour before cooling to ambient temperature. The ceramic yield was calculated and the sample was analyzed for C, N and O content. The results for examples 1–4 are summarized in Table I.

TABLE 1

MeVi Siloxane Cyclics/Low Molecular Wt. HPZ Blends

| Example # | HPZ wt. % | MeVi wt. % | Lupersl 101, wt. % | *Ceramic Yield wt. % | C wt. % | N wt. % | O wt. % |
|---|---|---|---|---|---|---|---|
| 1 | 98.0 | 0 | 2.0 | 40.0 | 11.5 | 25.6 | 1.98 |
| 2 | 96.0 | 2.0 | " | 41.0 | 12.1 | 25.4 | 2.78 |
| 3 | 93.1 | 4.9 | " | 47.1 | 132 | 24.1 | 2.86 |
| 4 | 88.2 | 9.8 | " | 47.9 | 15.4 | 22.5 | 4.66 |

*Indicates cure of 10 minutes at 175° C. and pyrolysis of 1200° C. under argon

These results show that addition of up to about 10 wt. % methylvinyl cyclosiloxanes only has minor effects on the ceramic composition resulting from pyrolysis of these blends.

Examples 5 through 11

Ceramic Oxidation Testing

Seven blends as set forth in Table 2A were prepared in the same manner as examples 1–4. The branched MeVi siloxane consisted of 10 mole % (MeSiO$_{1.5}$) and 90 mole % of the methylvinyl cyclosiloxanes of Example 1. Aliquots of each were cured and pyrolyzed as described in examples 1–4. Each char was analyzed for ceramic yield and C, N, Si and O and the results are summarized in Table 2-A.

A 0.25 to 0.30 gram aliquot of these chars were weighed into mullite crucibles and oxidized by heating at 3.3° C./minute to 1000° C. and holding 10 hours at 1000° C. under open air atmosphere. The oxidized chars were evaluated for weight change, appearance change and C,N and O content. All results are summarized in Table 2-B below.

TABLE 2-A

Cure and Pyrolysis of Branched MeVi Siloxane/HPZ Blends cured with 2.0 wt % Lupersol 101 catalyst

| Example # | HPZ wt. % | Branched MeVi siloxane wt. % | *Ceramic Yield wt. % | C wt. % | N wt. % | Si wt. % | O wt. % |
|---|---|---|---|---|---|---|---|
| 5 | 98.0 | 0 | 42.4 | 12.4 | 26.6 | 55.8 | 1.45 |
| 6 | 93.1 | 4.9 | 47.6 | 14.5 | 23.9 | 56.6 | 3.08 |
| 7 | 88.2 | 9.8 | 49.7 | 16.3 | 21.7 | 54.5 | 5.28 |
| 8 | 78.4 | 19.6 | 52.9 | 19.0 | 18.8 | 51.1 | 8.47 |
| 9 | 68.6 | 29.4 | 57.7 | 20.8 | 16.5 | 49.5 | 12.30 |
| 10 | 58.8 | 39.2 | 61.2 | 22.8 | 14.1 | 47.0 | 15.11 |
| 11 | 49.0 | 49.0 | 65.2 | 25.1 | 11.1 | 45.3 | 15.68 |

*Indicates cure of 10 minutes at 175° C. and pyrolysis of 1200° C. under argon

TABLE 2-B

Oxidation of Chars derived from Branched MeVi Siloxane/HPZ Blends

| Example # | HPZ wt. % | Branched MeVi siloxane wt. % | *Oxid. Wt. chg. % | Oxidaton Appearance | C wt. % | N wt. % | O wt % |
|---|---|---|---|---|---|---|---|
| 5 | 98.0 | 0 | +0.53 | black | 11.6 | 25.9 | 2.86 |
| 6 | 93.1 | 4.9 | +7.4 | black | 7.4 | 17.4 | 21.1 |
| 7 | 88.2 | 9.8 | +11.4 | dark gray | 3.9 | 9.8 | 32.6 |
| 8 | 78.4 | 19.6 | +8.65 | gray | 2.4 | 5.2 | 41.9 |
| 9 | 68.6 | 29.4 | +6.48 | salt/pepper | 0.60 | 0.9 | 53.8 |
| 10 | 58.8 | 39.2 | +3.47 | lite gray | 0.48 | 0.5 | 50.3 |
| 11 | 49.0 | 49.0 | +0.88 | salt/pepper | 2.2 | 0.4 | 48.5 |

*Indicates Oxidation of 10 hours at 1000° C.

These results indicate that the ceramics derived from these blends have reasonable oxidative stability under the conditions examined.

Composite Preperation

1. Ceramic Matrix Composite Fabrication

A slurry of BN (15 g) in a solution of the resin prepared in U.S. Pat. No. 5,262,553 (105 g) was used to impregnate a piece of heat-treated, BN-coated, Ceramic Grade, 8 harness satin weave Nicalon™ cloth (55.75 g). The cloth was cut into six 15 cm×15 cm pieces which were stacked, warp alligned, vacuum-bagged, heated to 75° F. before applying 100 psi, and then heated further to 450° F. for 6 hours. The resultant plate was pyrolyzed to 1200° C. under inert atmosphere at 2.2° C./min to 285° C., holding for 20 hours, heating at 0.8° C./min to 1000° C., holding for 1 hour, heating at 3.3° C./min to 1200° C., holding for two hours and then allowing the furnace to cool to room temperature. After pyrolysis the plate was cut into 1.3 cm by 5 cm samples with a diamond saw. The pyrolyzed plates had an average apparent porosity of 33.0% and an average density of 1.63 g/cc. The plates were repeatedly densified as described below.

Neat Densification Screening

Examples 12 through 23

Neat densification screening experiments were carried out using 1.3 cm×5 cm composites, prepared as described above, and the blends form examples 1–4. One composite was evaluated in each formulation at temperatures of 20° C., 50° C. and 80° C. resulting in examples 12 through 23.

The densification cycle used for example 16 will be described to illustrate the densification screening procedure. A 1.3 cm×5 cm composite was placed in a dried 2.5 cm inner diameter testube equipped with side arm inlet and the blend of example 1 was added (under argon flow) to a point 2.5 cm above the top of the composite. The test tube was stoppered and vacuum was applied gradually and the set up was placed under less than 10 mm pressure over 10 to 15 minutes and this reduced pressure condition was maintained for 30 minutes with periodic dynamic vacuum. The set up was then back filled with argon and a 50° C. constant temperature bath was applied for 45 minutes with constant temperature bath stirring maintained. The composite was then removed from the blend while still warm then air dried 10 minutes and then kept under argon until pyrolysis. The composite was then pyrolyzed to 1200° C. under $N_2$ using a standard composite pyrolysis condition of: ambient to 285° C. at 2.2° C./min., 2 hour hold at 285° C. then to 1200° C. at 2.5° C./min. with 2 hour hold at 1200° C. The composite was then evaluated for weight pick up and the densification cycle was repeated.

Examples 12 through 23 were all put through a total of 10 densification cycles and final weight pick up, porosity and density results are summarized in Table 3.

TABLE 3

| | | Neat Densification Screening Results | | | | | |
|---|---|---|---|---|---|---|---|
| Ex. # | HPZ wt. % | MeVi silox wt. % | Tp. °C. | Init. wt. gms | Densi- ficaton cycles | Final weight grams | Final Por./Den. %/g/ml |
| 12 | 98.0 | 0 | 20 | 3.0170 | 10 | 4.1574 | 8.4/2.13 |
| 13 | 96.0 | 2.0 | " | 2.9083 | " | 3.9988 | 7.4/2.13 |
| 14 | 93.1 | 4.9 | " | 3.0018 | " | 4.0765 | 5.3/2.15 |
| 15 | 88.2 | 9.8 | " | 2.8600 | " | 3.9164 | 4.8/2.13 |
| 16 | 98.0 | 0 | 50 | 3.0303 | " | 4.2413 | 7.6/2.13 |
| 17 | 96.0 | 2.0 | " | 2.9874 | " | 4.1723 | 6.6/2.20 |
| 18 | 93.1 | 4.9 | " | 3.0237 | " | 4.1726 | 5.1/2.13 |
| 19 | 88.2 | 9.8 | " | 3.0976 | " | 4.3282 | 4.5/2.21 |
| 20 | 98.0 | 0 | 80 | 3.2050 | " | 4.4645 | 7.3/2.16 |
| 21 | 96.0 | 2.0 | " | 3.1419 | " | 4.3691 | 6.8/2.15 |
| 22 | 93.1 | 4.9 | " | 3.0020 | " | 4.1836 | 3.9/2.18 |
| 23 | 88.2 | 9.8 | " | 3.0870 | " | 4.2936 | 3.8/2.19 |

These results show that there is a processing advantage to employing the crosslinkers. This is evident by the lower final porosities.

Neat Densification with Degassing

Examples 24 through 42

A set up was configured to evaluate neat densification of multiple one×three inch composites with vacuum degassing of the densification blend prior to composite contact. The setup comprised a one liter resin kettle equipped with heating mantle, air driven stirrer, thermometer, 500 ml side arm addition funnel, argon/vacuum inlet and composite rack. The composite rack was connected to a heavy gauge wire extended through a septumed kettle outlet to allow raising the composite rack above the blend liquid level for drainage.

A neat densification cycle for composite examples 24 through 27 will be described to illustrate the neat densification with degassing procedure.

The above described composite rack was loaded with the composites of examples 24–27 and the rack was positioned in the bottom of the dried kettle in a manner to minimize required blend volume needed but to avoid composite composite contact. The remaining dried apparatus from above was lubricated and assembled warm and immediately placed under argon purge. The blend of Example 4 (350–400 ml) was added to the addition funnel. The stirrer was started and the pressure was reduced to less than 10 mm over 15 minutes. This reduced pressure condition was maintained for 15 minutes with periodic dynamic vacuum and the densification blend was then added to the kettle under static vacuum. The above reduced pressure condition was maintained for 15 minutes and the apparatus was backfilled with argon. The kettle was then heated to 80° C. and maintained for 30 minutes at 80° C. under argon. The heating mantle was then removed and the stirrer shaft and thermometer were raised to the top of the kettle and the composite rack was raised above the liquid blend to allow drainage of warm blend solution. The kettle was then cooled and the composites were removed and then dried and pyrolyzed using the procedure described in example 16 above.

Example 38 through 42 composites were processed at ambient temperature.

Final weight pick up, porosity, density and physical property results for example 24 through 42 composites are summarized in Table 4 below.

TABLE 4

Neat Densification of Multiple Composites with Degassing

| Ex # | HPZ wt. % | MeVi silox wt. % | Tp. °C | Init wt. g | Initial Por./Den %/g/ml | Den. total cyc's | Final wt. grams | Final Por./Den %/g/ml | strength ksi/fail mode |
|---|---|---|---|---|---|---|---|---|---|
| 24 | 88.2 | 9.8 | 80 | 8.314 | 31.6/1.73 | 10 | 10.606 | 2.1/2.17 | 28.5/*B |
| 25 | " | " | " | 8.162 | 30.7/1.74 | 6 | 10.071 | 9.4/2.16 | 36.4/B |
| 26 | " | " | " | 8.383 | 30.2/1.76 | 8 | 10.457 | 5.0/2.19 | 33.2/B |
| 27 | " | " | " | 8.276 | 29.1/1.77 | 4 | 9.825 | 13.1/2.10 | 39.2/B |
| 28 | " | " | " | 8.645 | 30.2/1.69 | 9 | 10.855 | 3.5/2.18 | NA |
| 29 | " | " | " | 8.620 | 30.9/1.68 | 9 | 10.844 | 3.3/2.19 | " |
| 30 | " | " | " | 8.847 | 31.3/1.68 | 9 | 11.158 | NA/NA | 42.8/B |
| 31 | " | " | " | 8.729 | 30.8/1.68 | 9 | 10.977 | 3.0/2.19 | NA |
| 32 | " | " | " | 3.973 | 30.3/1.69 | 4 | 4.786 | NA/NA | 45.3/#T |
| 33 | " | " | " | 8.124 | 29.8/1.74 | 9 | 10.207 | 3.8/2.23 | NA |
| 34 | " | " | " | 7.950 | 29.2/1.75 | " | 9.947 | 3.9/2.22 | NA |
| 35 | " | " | " | 8.089 | 29.4/1.76 | " | 10.101 | 4.2/2.22 | NA |
| 36 | " | " | " | 7.980 | 29.5/1.74 | " | 10.020 | 4.4/2.21 | NA |
| 37 | " | " | " | 3.622 | 30.1/1.72 | " | 4.528 | NA/NA | 34.0/B |
| 38 | " | " | 20 | 8.690 | 27.6/1.76 | 7 | 10.407 | 7.4/2.12 | 41.4/T |
| 39 | " | " | " | 9.566 | 27.1/1.77 | 8 | 11.466 | 4.9/2.15 | NA |
| 40 | " | " | " | 8.102 | 27.4/1.76 | 6 | 9.656 | 8.7/2.15 | 43.9/T |
| 41 | " | " | " | 8.560 | 27.7/1.76 | 8 | 10.257 | 5.5/2.14 | 48.6/T |
| 41 | " | " | " | 2.863 | 27.3/1.77 | 5 | 3.371 | 10.2/2.11 | 54.5/T |

*B indicates brittle failure mode
T indicates tough failure mode with tensile shear These results show advantages to processing at elevated temperatures in that faster reduction of porosity is seen.

Comparative Example 1 and 2

Two 0.5×2.0 inch composites, prepared as described previously, were put through 45–50 wt. % HPZ in xylene densification cycles (without crosslinker) until the desired porosity was achieved. The results are summarized in Table 5 below.

TABLE 5

Comparative Examples: HPZ/Xylene Solution Densification

| Comparative Example # | Densification Mode | Total Densification cycles | Final Por./Den. % g/ml |
|---|---|---|---|
| 1 | HPZ/XyleneSoln | 15 | 4.9/2.11 |
| 2 | " | " | 4.2/2.10 |

These comparative Examples show that more impregnation cycles are required when a solvent is used in the infiltration process.

That which is claimed is:

1. A method of forming a ceramic matrix composite comprising preparing a mixture comprising a silazane polymer having Si—H bonds, a crosslinker selected from the group consisting of alkenyl functional cyclosiloxanes and alkenyl functional cyclosilazanes and a crosslinking promoter;

impregnating an assembly of fibers with the mixture;

heating the impregnated fibers to a temperature sufficient to crosslink the silazane polymer to produce a pre-preg; and pyrolyzing the pre-pre at a temperature sufficient to ceramify the pre-preg.

2. The method of claim 1 wherein the resultant ceramic matrix composite is impregnated and pyrolyzed to form an oxidatively stable ceramic matrix composite.

3. A method of densifying a porous ceramic comprising:

preparing a mixture comprising a silazane polymer having Si—H bonds, greater than about 15 wt % of a crosslinker selected from the group consisting of alkenyl functional cyclosiloxanes and alkenyl functional cyclosilazanes and a crosslinking promoter;

impregnating a porous ceramic with the mixture;

heating the impregnated porous ceramic to a temperature sufficient to crosslink the silazane polymer; and pyrolyzing the porous ceramic containing the cured silazane polymer to a temperature sufficient to ceramify the polymer.

4. A solvent free method of densifying a porous ceramic comprising:

preparing a mixture consisting essentially of a silazane polymer having Si—H bonds, greater than about 15 wt % of a crosslinker selected from the group consisting of alkenyl functional cyclosiloxanes and alkenyl functional cyclosilazanes and a crosslinking promoter;

impregnating a porous ceramic with the mixture;

heating the impregnated porous ceramic to a temperature sufficient to crosslink the silazane polymer; and pyrolyzing the porous ceramic containing the cured silazane polymer to a temperature sufficient to ceramify the polymer.

* * * * *